United States Patent [19]

Donnelly

[11] 4,002,235

[45] Jan. 11, 1977

[54] HEAT TRANSFER PACKAGE WITH A COLLAPSIBLE, PLEATED, FRUSTO-CONICAL, UPPER WALL SECTION

[75] Inventor: William R. Donnelly, Piqua, Ohio

[73] Assignee: Readi Temp, Inc., Piqua, Ohio

[22] Filed: Feb. 27, 1975

[21] Appl. No.: 553,822

Related U.S. Application Data

[63] Continuation of Ser. No. 355,925, April 30, 1973, abandoned.

[52] U.S. Cl. .................................... 206/219; 62/4; 126/263; 206/223
[51] Int. Cl.² ........................................ C25D 17/02
[58] Field of Search ................ 62/4; 206/219, 223; 126/263

[56] References Cited

UNITED STATES PATENTS

| | | | |
|---|---|---|---|
| 2,968,932 | 1/1961 | Vance et al. | 62/4 |
| 3,675,637 | 7/1972 | Trimble | 126/263 |

Primary Examiner—Frank W. Lutter
Assistant Examiner—Frank Sever
Attorney, Agent, or Firm—Jerome P. Bloom

[57] ABSTRACT

A heat transfer package characterized by a shell-like container within which a receptacle is nested and to which said receptacle is integrally connected. The shell-like container features an upstanding self-stabilizing outer wall section provided with air escape holes and so constructed to enable the wall section to be axially compressed yet having the property to retain its vertical stability on compression. Heat transfer means are included within said outer shell in a separated relation to the material within said receptacle and so arranged to be activated by an axial compression of said outer shell. On an axial compression of said shell, not only is there produced an activation of the heat transfer medium embodied therein but the wall section is collapsed into itself in a locked position while the package is resting on its base.

11 Claims, 3 Drawing Figures

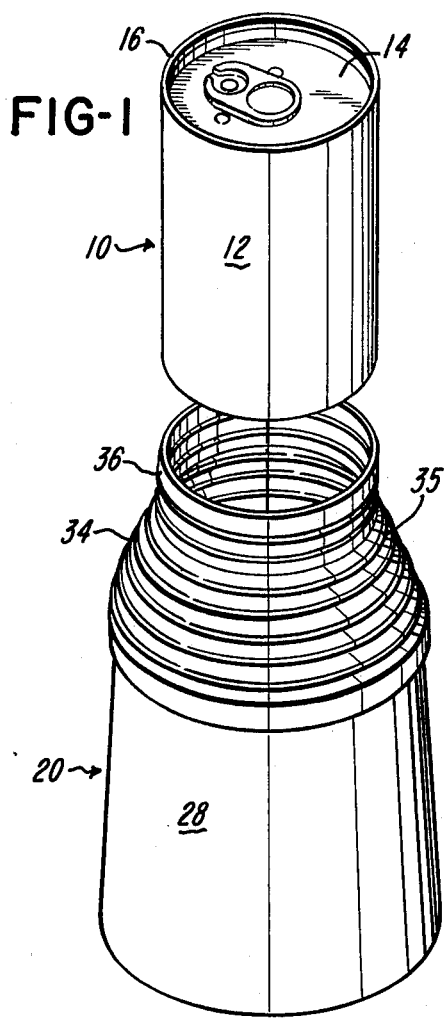
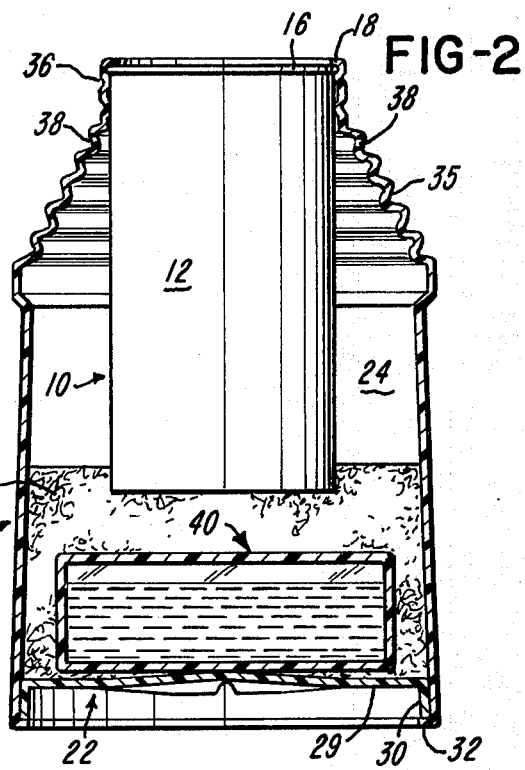
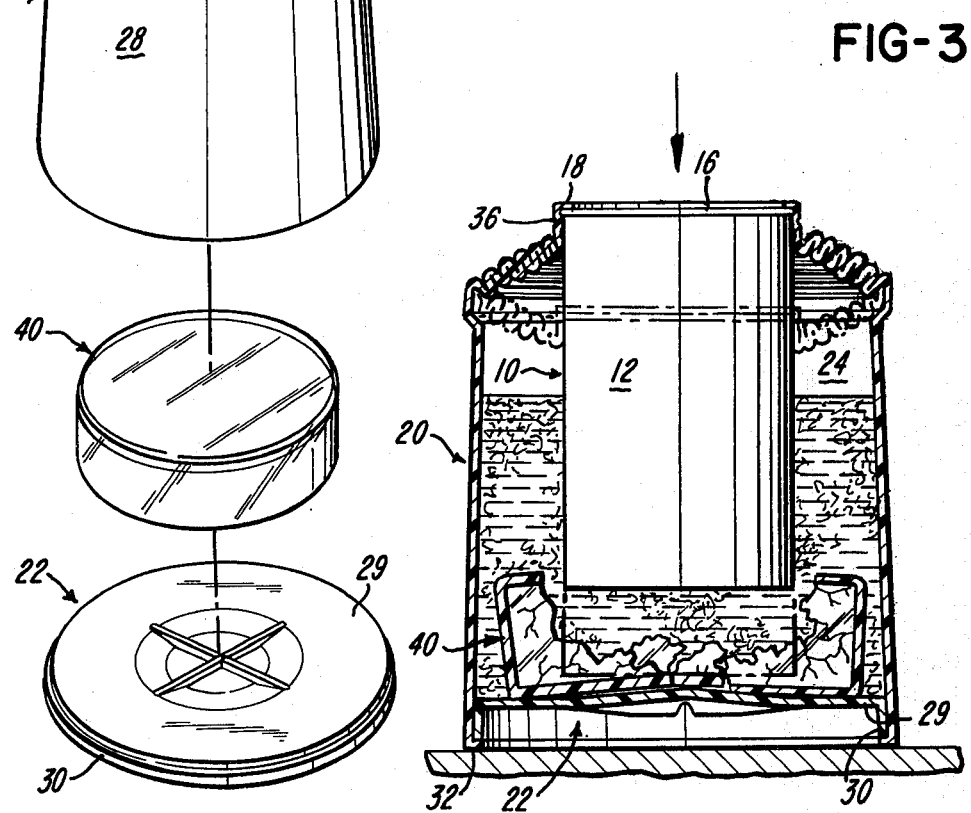

HEAT TRANSFER PACKAGE WITH A COLLAPSIBLE, PLEATED, FRUSTO-CONICAL, UPPER WALL SECTION

This is a continuation of application Ser. No. 355,925, filed Apr. 30, 1973 now abandoned.

BACKGROUND OF THE INVENTION

This invention relates to improvements in heat transfer units and more particularly to such heat transfer units as form a package for products which desirably are to be heated or cooled at the time of use. As here contemplated, each such unit will incorporate heat transfer means in an inactive state together with and normally separated from a liquid energizer, the intermixture of which in said heat transfer means will activate the same. The intermixture described is in this instance initiated by an axial compression of the container portion of the heat transfer package which forms its outer shell.

Certain disadvantages have attended the usage of prior art heat transfer units directed to the purpose described. These have stemmed, at least in part, from an inobviousness as to how and to what extent a control must be exerted to initiate the necessary heat transfer action. Rupturing and leakage at the joints has been a prevalent problem in squeeze type units of the type described. A more serious problem has been the difficulty in providing means to insure a rapid heat transfer effect such as required in an acceptable package. Difficulty has also been found in achieving proper structural requirements for a package of the type described. For such a package to be acceptable, it must be leak-proof, have adequate shelf life and be difficult to accidentally trigger while remaining susceptible of a simple and easy operation, as and when required.

In general a considerable number of heat transfer units as heretofore proposed have suffered problems of the type above noted, been limited as to their application, and their function has usually been less than satisfactory.

SUMMARY OF THE INVENTION

The instant invention has in view heat transfer units of a nature to embody material desirably to be heated or cooled at a particular place and time of use. The invention units incorporate heat transfer knowledge of the prior art but add significant improvements which render them more economical to fabricate, more efficient and satisfactory in use and unlikely to malfunction.

In its preferred embodiment the invention provides a self-stabilized package including an inner receptacle portion arranged to receive or contain a variety of products which are to be heated or cooled at the time of their use. The receptacle is provided with a releasable seal at the mouth thereof and about its lip it is integrally connected with and suspended from the neck of a shell-like outer container which provides the exterior of the invention package. The connection of the receptacle within the shell-like outer container provides interiorly of the container a sealed pocket arranged to receive heat transfer means in a segregated and inactive state. The outer peripheral wall portion of the shell-like container is characterized by the inclusion therein of an axially extended section which is pleated in the manner of an accordion or other bellows type structure.

It is a feature of the invention units that they may be stably seated on their base and by virtue of a pressure applied axially to the top of the package one may produce a compression of the pleated bellows section of the outer wall thereof. As a result of this compression it is so arranged that the heat transfer means within the sealed pocket will be immediately energized. It is a further feature of the invention package that its compression as described produces not only a nesting of the inner receptacle within the heat transfer media but a limited chamber for such heat transfer media. This limited chamber enables a condition that the inner receptacle and its contents are fully encompassed by the heat transfer media to facilitate a continuing and optimal heat exchange between the heat transfer media and the contents of the receptacle.

It is therefore a primary object of the invention to provide an improved package unit containing heat transfer chemicals which is economical to fabricate, more efficient and satisfactory in use, adaptable to a wide variety of applications and unlikely to malfunction.

Another object of the invention is to provide a heat transfer unit affording a package integrating materials to be heated or cooled, which package is designed to provide for an improved application to said materials of contained heat transfer media.

A further object of the invention is to provide a generally new heat transfer package the structure of which is such to make it inherently self evident as to the manner of its use.

Another object of the invention is to provide a heat transfer unit of substantial strength and rigidity which has a build-in adaptability to be axially contracted to provide a controlled chamber within which heat transfer media is activated in an optimally surrounding relation to a receptacle the contents of which are required to be subjected to a heat transfer action.

An additional object of the invention is to provide a container for a heat transfer unit the outer wall of which is self-stabilizing yet includes a bellows-like portion providing for a controlled collapse thereof with no loss of its self-stabilizing capacity.

A further object of the invention is to provide a new and improved heat transfer package embodying materials desirably to be heated or cooled at the time of use characterized by a shell-like outer wall structure incorporating a bellows-like section therein which enables a controlled collapse thereof and, substantially, a lock thereof in the collapsed condition to facilitate heat transfer as between contained heat transfer media and the material to be heated or cooled.

An additional object of the invention is to provide a heat transfer unit or package of an improved nature possessing the advantageous structural features, the inherent meritorious characteristics and the means and mode of use herein described.

With the above and other incidental objects in view, as will more fully appear in the specification, the invention intended to be protected by Letters Patent consists of the features of construction, the parts and combinations thereof and the mode of operation as hereinafter described, or their equivalents.

Referring to the drawings, wherein one but not necessarily the only form of embodiment of the invention is shown, FIG. 1 is an exploded view in perspective of a heat transfer unit in accordance with an illustrated embodiment of the invention;

FIG. 2 is a view in longitudinal section of the heat transfer unit of FIG. 1, shown in an assembled package form prior to use; and FIG. 3 is a view similar to FIG. 2 showing the heat transfer unit being collapsed in an activating step taken preparatory to use of contained material.

As seen from the drawings, an assembled unit forming a package in accordance with the invention includes an inner receptacle 10 which receives or contains therein food, drink or other material which at the time of its use is to be heated or cooled. The receptacle 10 includes a cup porton 12 the mouth of which is bridged by a releasable seal 14. The lip 16 of the cup portion 12 is integrated, by appropriate connection, to an overlapped flange 18 defining the opening to the top of a shell-like container 20. So connected, the receptacle 10 is suspended to nest interiorly of the container 20, in peripherally spaced relation to its interior wall surface and in spaced elevated relation to its base 22. This produces a sealed chamber 24, a portion of which having a generally cylindrical configuration lies below the receptacle 10 and another portion of which having an annular configuration is in peripherally surrounding relation to the receptacle 10. The container 20 is a self-stabilized vertically orienting structure formed preferably of plastic materials such as polyethylene or polystyrene characterized by strength and lightness of weight and with characteristics of non-reaction with contained heat transfer chemicals. As illustrated, the peripheral wall of the shell-like container 20 is comprised of two distinctively different sections. The lower secton 28 thereof has a generally tubular form and is rigid in the sense of being substantially incompressible in an axial sense. The bottom of the container is provided by a disc-shaped element 29 which has at its outer periphery a downturned flange 30. The latter is encircled by the lower extremity of the wall section 28 and a sealing connection is provided therebetween, preferably by a spin welding process. This provides that an inturned flange 32 be formed on the lower end of the wall section 28 to underlie and provide a seat for the flange 30. Of course, by virtue of the spin welding process an integration is effected between the flanges 30 and 32. The disc forming the container base 22 is provided with relatively displaced portions forming rib-like projections thereon to strengthen the container base. The upper section 34 of the peripheral wall of container 20, which forms an extension of the lower section 28, has an inwardly stepped pleated shape giving it a bellows-like configuration. As between the wall sections 28 and 34, the same may be originally an integrated structure or they may be separately formed and then appropriately integrated, by welding or the like.

The upper wall secton 34 is generally frusto-conical in outline and terminates at its upper extremity, which is relatively reduced in cross section, in a generally tubular extension 36 sealingly engaged about the upper end of receptacle 10 and terminating in the overlapped flange 18.

The bellows-like wall section 34 has its pleats individually identified in the drawings by the numeral 35. Located at respectively diametrically spaced locations in two of such pleats are small holes 38 the purpose of which shall be further described.

The bellows-like wall section 34 is preferably molded of relatively resilient material, self-stabilizing in character, to insure that this wall section will normally assume the extended position shown in FIG. 2 of the drawings.

As noted previously, the receptacle 10 nests within the shell-like container 20 so its outer surface is spaced both from the peripheral wall of the shell and from its bottom closure portion 29 to form thereby the sealed chamber 24. The latter serves to receive therein a sealed ampule 40 of frangible plastic material the contents of which may be water or any other energizing medium required to activate the charge 42 of heat transfer chemicals which are also included in the chamber 24. As may be seen in FIG. 2, the ampule 40 will seat on the disc 29 forming the bottom of the container 20 while the charge of heat transfer chemicals 42 will position peripherally of the ampule and in overlying relation thereto, adjacent the bottom of the receptacle 10.

The chemicals in the charge 42 will normally be in a relatively loose dry state and a relatively powder-like form. The precise nature of the chemicals will depend, of course, on whether the contents of the receptacle 10 are to be heated or cooled. Basically it is contemplated that the chemicals will be of a nature that they will remain inactive in their dry state and so characterized that upon wetting thereof they will become energized to produce a heat transfer action. In this respect it is noted that the wall of the receptacle 10 will be preferably made of a thin lightweight material such as aluminum which is a good heat conductor.

In the assembly and charging of a heat transfer package in accordance with the illustrated embodiment of the invention, the cup portion 12 of the receptacle 10 will be filled with a product which at the time of use should desirably be heated or cooled. The contents of the cup 12 may either be food or drink or even other materials the temperature of which at the time of use is critical. In any case, once the cup is filled, the releasable seal is applied to cap the top thereof in a suitable manner. It is noted that the releasable seal 14 will normally have at least a portion thereof subject to displacement such as by pulling on an attached tab-like structure 15. The details of the same are well known in the container art and need not be here described. The receptacle 10 may then be applied in the shell-like container 20 by insertion through the opening defined by the upper tubular extension 36 of the container wall section 34. The installation of receptacle 10 may utilize the phenomenon of elastic memory, the neck defined at the top of the container 20 by the tubular extension 36 being spread apart to admit the receptacle and then allowed to restore itself to a tight fitting gripping engagement about its upper end. In preferred practice, the uppermost edge of the extension 36 will be spun welded to form flange 18, which overlaps the lip of the cup portion 12 of the receptacle 10. The arrangement is such to fix the receptacle 10 in a position of suspension from the apex portion of the bellows formed wall section 34 of the container 20. The positioning of the receptacle 10 and the ampule 40 is such that the latter is directly aligned with and spaced immediately below the bottom of the receptacle in its originally packaged condition.

In a preferred assembly procedure, the charge 42 of heat transfer materials of the nature required, in a dry inactive state, is normally introduced through the open bottom of the shell-like container 20 prior to the application of the disc 29. The ampule 40 is then introduced, whereupon the disc forming the container base 22 will be applied as previously described and integrated by spin welding.

With the heat transfer package assembled in accordance with the invention, it may be vertically positioned on its base. The external configuration thereof will resemble that of a cylindrical cup superposed by a vertically projected bellows-like structure having a frusto-conical configuration and bridged at its top by the releasable seal 14 covering the contents of the receptacle 10.

Preparatory to use of a heat transfer package as described and a consumption or other utilization of the contents of the receptacle 10, the invention contemplates that one need merely apply the heel of his hand to the upper end of the assembly to produce an axially directed downward thrust thereon. At such time, of course, the assembly will be oriented as shown in FIG. 2 of the drawings. While the wall section 34 of the container 20 will normally be self-stabilizing in its axially extended position and be sufficiently load bearing to support the receptacle 10 in such position, the pleats of the wall section 34 are so designed that this direct axial thrust will cause a collapse thereof in bellows-like fashion. The thrust by the heel of the hand continued and firmly and deliberately applied will cause the bellows-shaped wall section to collapse on itself and, at a point in its displacement, the inner or apex portion of the bellows section will nest within the lower portion thereof and pass a dead center position. As dead center is passed, the bellows and the connected receptacle 10 will be locked in a downwardly thrust position within the lower section 28 of the container wall structure. In the course of the movement of the receptacle 10 under the influence of this axial thrust, accommodated by the bellows-like form of the upper wall section 34 of the container, the lower end of the receptacle will forceably contact and fracture the frangible ampule 40 to release its liquid contents. The liquid contents of the ampule 40 will then rapidly disperse through the charge of chemicals 42 which surrounds the ampule, lies in superposed relation to the ampule and about the outer wall of the receptacle 10. In the process of this contraction of the axial length of the container 20 it will be seen that the sealed chamber 24 is effectively reduced as to its volume and the receptacle 10 is caused to nest deeply within the activated chemicals which lie therebelow and in surrounding relation thereto. In the process of nesting, these chemicals, as they are wet, will accordingly rise up the sides of the receptacle 10. The arrangement is such to insure that the heat transfer action which will take place, as between the contents of the receptacle 10 and the chemicals which are activated in the chamber 24, will be most effectively applied substantially the length of the receptacle wall. This insures an extremely fast and effective heating or cooling of the receptacle contents, the effect being dependent on whether the charge of chemicals 42 are endo-thermic or exo-thermic in character.

Attention is directed to the fact that the small holes 38 provided in the bellows, towards its upper end, will normally be positioned and configured to preclude entrance of air and moisture inwardly the chamber 24 but on depression of the bellows-like wall section 34 they will be momentarily opened by reason of their formation in the bellows to briefly permit the escape of air contained in the chamber 24 and facilitate the operation just described. The nature of the chemical charge, once activated, is such that a gel-like substance will be produced which will practically immediately, upon such depression, fill the holes 38 and preclude loss of heat transfer effect. It is self-evident that the material of the container 20 is such that it is a poor conductor of heat and therefore does not provide any source of heat exchange in use of the invention units.

Accordingly, in the practice of the invention the contents of receptacle 10 are quickly heated or cooled, whereupon the user can substantially immediately break the seal 14 by whatever means are provided and have access to the contents of the receptacle which are then at the desired temperature, ready for use.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

Having thus described my invention, I claim:

1. A heat transfer package comprising a container including a base and a peripheral outer wall structure which is self-stabilizing and adapted thereby to normally maintain the configuration of said container, said wall structure being configured to receive, interiorly of one end thereof, a receptacle the contents of which are to be subjected to heat transfer, said wall structure having in connection therewith means to engage and form a seal about a portion of said receptacle and to mount said receptacle so as to nest interiorly within one end of said container and in substantially spaced relation to the opposite end thereof, means forming a closure of said opposite end of said wall structure forming said base, said closure being arranged to define, with said receptacle, a sealed chamber, a peripheral wall portion of which is provided by said outer wall structure, said chamber accommodating therein heat transfer material in an inactive state, whereby said material, when activated, induces heat exchange with its environment, and said outer wall structure being an integrated wall structure, portions of which are arranged to nest, one within the other, in response to a predetermined axial force applied to the upper portion of said receptacle while said container is resting on said base, thereby to provide means for locking said wall portions in their nested relationship, thereby to produce a reduction in the axial length of said outer wall structure and to lock said receptacle in an inwardly nested proximity to said heat transfer material, thereby maximizing the potential for heat exchange between said material and the contents of said receptacle.

2. A heat transfer package as in claim 1 wherein said portions of said integrated outer wall structure, which are adapted to nest, include pleats arranged to collapse and move inwardly relative to an adjacent portion of said outer wall structure in response to said axially applied force.

3. A heat transfer package as in claim 1 wherein said nesting wall portions of said outer wall structure include means to permit the escape of gas from said chamber thereby to facilitate the locking of said receptacle in inwardly nested proximity to said heat transfer material.

4. A heat transfer package as in claim 1 wherein said portions of said outer wall structure, which are arranged to nest, include one portion which has a pleated bellows-like form, pleats of which are arranged to position within and concentric to other portions of said one portion in response to said axially applied force and to lock inwardly of said other portions.

5. A heat transfer package as in claim 1 wherein at least a portion of said one portion of said outer wall structure includes openings for passage of gas from said chamber as said receptacle is caused to move to an inwardly nested proximity to said heat transfer material.

6. A heat transfer package as in claim 1 wherein the said one end of said outer wall structure includes said one portion of pleated bellows-like form.

7. A heat transfer package as in claim 6 wherein said pleated bellows-like wall portion has a generally frustoconical shape, the apex portion of which is connected with said receptacle to mount the major portion of said receptacle in a nested spaced relation to the interior wall surface of said one end of said wall structure.

8. A heat transfer package as in claim 7 wherein that an activating means for said heat transfer material is provided in said chamber in a sealed ampule which lies in the path of the receptacle, said ampule being arranged to be engaged by said receptacle and induced thereby to release its contents in response to the movement of said receptacle caused by the application of said axial force, as a result of which the receptacle is locked in nested proximity to the activated heat transfer material.

9. A heat transfer package as in claim 1 wherein an activating means for said heat transfer material is provided in said chamber in a sealed ampule which lies in the path of and in spaced relation to the receptacle, said ampule being arranged to be engaged by said receptacle and induced thereby to release its contents as the receptacle is caused to be locked in nested proximity to the so activated heat transfer material.

10. A heat transfer package as in claim 1 wherein one of said nesting wall portions is a collapsible wall portion at least a portion of which has a generally frustoconical shape and a bellows-like pleating which is substantially self-stabilizing, to maintain, normally, a relatively extended configuration, said pleating being so formed that the pleats thereof will interfold under the influence of an axial force applied to the top of said receptacle, to therby lock said pleating in a collapsed condition including means embodied in a portion of said pleats to provide an escape of air from said chamber thereby accommodating the collapse of said collapsible wall portion in the application of said axially applied force.

11. A heat transfer unit as in claim 1 wherein said receptacle is mounted interiorly of said container wall structure so as to be maintained in generally concentric spaced relation to the interior wall surface of said wall structure, said chamber containing therein an activating agent for said heat transfer material which is normally separated from said heat transfer material by an interposed containing means, which is normally spaced from and positioned to be ruptured by said receptacle as said receptacle is thrust axially within said chamber causing nesting of said wall portions which are arranged to nest in response to said axial force, to provide thereby for the activation of said heat transfer material, whereby in the locked nested position of said receptacle, said activated material extends in substantially surrounding relationship to the receptacle and its contents.

* * * * *

UNITED STATES PATENT AND TRADEMARK OFFICE
CERTIFICATE OF CORRECTION

PATENT NO. : 4,002,235
DATED : January 11, 1977
INVENTOR(S) : William R. Donnelly It is certified that error appears in the above-identified patent and that said Letters Patent are hereby corrected as shown below:

Col. 3, line 35, "secton" is corrected to read -- section --;

Col. 3, line 57, "secton" is corrected to read -- section --.

Col. 6, line 58, -- and -- is inserted before "thereby".

Col. 7, line 16 (Claim 5, line 1) "1" is corrected to read -- 4 --;

Col. 7, line 22 (Claim 6, line 1) "1" is corrected to read -- 4 --;

Col. 7, line 31 (Claim 8, line 1) "that" is deleted.

Col. 8, line 19, a comma is inserted following "condition";

Col. 8, line 39 (Claim 11, line 16) a comma is inserted following "receptacle".

Signed and Sealed this

Tenth Day of May 1977

[SEAL]

Attest:

RUTH C. MASON
Attesting Officer

C. MARSHALL DANN
Commissioner of Patents and Trademarks